United States Patent [19]
Kikuta

[11] Patent Number: 5,600,637
[45] Date of Patent: Feb. 4, 1997

[54] SYSTEM AND METHOD FOR TRAFFIC DISTRIBUTION, INTERMEDIATE DEVICE AND END DEVICE

[75] Inventor: Rumiko Kikuta, Kawasaki, Japan

[73] Assignee: Fujitsu Limited, Kanagawa, Japan

[21] Appl. No.: 351,714

[22] Filed: Dec. 8, 1994

[30] Foreign Application Priority Data

Feb. 22, 1994 [JP] Japan .................................. 6-024454

[51] Int. Cl.⁶ ................................................ H04Q 11/00
[52] U.S. Cl. ............................................................ 370/389
[58] Field of Search .......................... 370/54, 60.1, 94.1, 370/94.2, 95.1, 95.3, 84, 58.2, 94.3

[56] References Cited

U.S. PATENT DOCUMENTS

| | | | |
|---|---|---|---|
| 4,507,781 | 3/1985 | Alvarez, III et al. | 370/95.3 |
| 4,789,983 | 12/1988 | Acampora et al. | 370/84 |
| 5,095,480 | 3/1992 | Fenner | 370/94.1 |
| 5,164,938 | 11/1992 | Jurkevich et al. | 370/94.1 |
| 5,398,012 | 3/1995 | Derby et al. | 370/54 |

FOREIGN PATENT DOCUMENTS

| | | | |
|---|---|---|---|
| 64-78051 | 3/1989 | Japan | H04L 11/00 |
| 2-260735 | 10/1990 | Japan | H04L 11/00 |

*Primary Examiner*—Douglas W. Olms
*Assistant Examiner*—Shick Hom

[57] ABSTRACT

A receiving unit receives a communication frame and a routing frame transmitted from an end device of the transmission source. A detection unit detects a traffic volume of the frame transmitted to the network of the destination. A routing frame processing unit creates a routing frame including a media access control address and a network entity title of an intermediate device, and creates a routing frame which indicates another intermediate device when the traffic volume exceeds a prescribed value. A transmission unit transmits the communication frame it received to the end device of the destination and transmits the routing frame which indicates the another intermediate device to the end device of the transmission source.

18 Claims, 17 Drawing Sheets

SYSTEM AND METHOD FOR TRAFFIC DISTRIBUTION, INTERMEDIATE DEVICE AND END DEVICE

BACKGROUND OF THE INVENTION

The present invention is related to a system and a method for traffic distribution that distributes the traffic volume in a plurality of networks, an intermediate device and an end device.

In traditional system for traffic distribution, for instance, each of the first intermediate devices and the second intermediate devices is connected to each of the first local area networks (Local Area Network is referred to as LAN hereinafter) and the second LAN.

The first end device and the second end device are connected to the first LAN and the third end device and the fourth end device are connected to the second LAN.

A frame of the first end device is transmitted to the third end device through the first intermediate device, when the first end device transmits the frame to the third end device.

Besides, the frame of the second end device is transmitted to the fourth end device through the second intermediate device, when the second end device transmits the frame to the fourth end device.

At this time, the first and the second intermediate devices take in the frame from the first LAN and transmit it to the second LAN.

The traditional system for traffic distribution estimates previously the traffic volume of the first LAN and the second LAN. The system for traffic distribution has been distributing the traffic volume through the predetermined intermediate devices among the end devices to be communicated. Namely, the traffic distribution has been executed statically However, in recent years, there are some cases that the intermediate device is connected to the transmission media of different transmission speed such as LAN and WAN (Wide Area Network), or the intermediate device is connected to CSMA/CD (Carrier Sense Multiple Access with Collision Detection) and FDDI (fiber distributed data interface).

Besides, there are some cases that only one of the two intermediate devices is used and the other intermediate device is not used. In this case, a large volume of frames from the transmission media whose transmission speed is quick are transmitted by the one intermediate device to the transmission media whose transmission speed is slow.

The one intermediate device is not capable of transmitting the all frames it received and occurs the abandonment of the frames. For this reason, there are some cases that a loss of the communication time and a disconnection of the communication itself occur.

In this case, the usage efficiency of the intermediate device is deteriorated, since the traffic distribution is executed statically and the other intermediate device is not used.

For this reason, it is required that the traffic volume of the network is distributed to the other intermediate device properly so as to lessen the parting of the frames. Namely, the execution of the dynamic traffic distribution has been desired up to this time.

SUMMARY OF THE INVENTION

It is a first object of the present invention to provide a system and a method for traffic distribution that distributes the traffic volume of the plurality of networks dynamically.

It is a second object of the present invention to provide an intermediate device which intermediates the frames so that the traffic volume of the plurality of networks is distributed dynamically and an end device which transmits and receives the frames.

The system for traffic distribution of the present invention is switched to another intermediate device when the traffic volume of one network is increased.

The present invention comprises a plurality of networks, a plurality of end devices and a plurality of intermediate devices.

Each of the end devices is connected to the corresponding network, and transmits and receives a communication frame and a routing frame. Each of the intermediate devices connects the plurality of networks one another and intermediates the communication frame.

Each of the intermediate devices comprises a receiving unit, a detection unit, routing frame processing unit and a transmission unit.

The receiving unit receives a communication frame and a routing frame transmitted from the end device of the transmission source.

The detection unit detects the traffic volume of the frame transmitted to each of the networks by the intermediate device.

The routing frame processing unit creates a frame including a media access control address which indicates the access point in which the intermediate device is connected to the network, and a network entity title which indicates the address allocated to the intermediate device as the routing frame. The routing frame processing unit informs the routing frame to the end device of each network.

The routing frame processing unit creates a routing frame which indicates another intermediate device when the traffic volume exceeds the prescribed value.

The transmission unit transmits a frame received by the receiving unit to the end device of the destination. The transmission unit transmits the routing frame which indicates another intermediate device from the routing frame processing unit to the end device of the transmission source, when the traffic volume of the network of the destination exceeds the prescribed value.

Besides, the routing frame processing unit receives from the receiving unit a media access control address which indicates the access point in which the end device is connected to the network from each end device of each network, and a network address which indicates the address allocated to the end device.

The routing frame processing unit creates a routing table which makes the media access control address and the network address corresponding one another in every end device.

And the end device comprises a communication frame unit, a routing frame processing unit, and a frame transmission/receiving unit.

The communication frame processing unit creates the communication frame to be transmitted and processes the communication frame it received.

The frame transmission/receiving unit receives the routing frame including the media access control address and the network entity title of the each intermediate device. The frame transmission/receiving unit receives the routing frame which indicates the another intermediate device, and transmits the communication frame to the intermediate device.

The routing frame processing unit manages the media access control address and the network entity title of the intermediate device received by the frame transmission/receiving unit.

The frame transmission/receiving unit transmits the frame to the intermediate device indicated by the routing frame after receiving the routing frame, and receives the communication frame addressed to the end device from the intermediate device.

Besides, the routing frame processing unit comprises a routing table and an address rewriting unit. The routing table manages the media access control address and the network address of the end device, and the media access control address and the network entity title of the intermediate device received by the frame transmission/receiving unit.

The address rewriting unit rewrites the destination media access address of the frame to be transmitted into the media access control address of the intermediate device indicated by the routing frames.

Hereupon, the frame transmission/receiving unit transmits a communication frame to the intermediate device indicated by the address rewriting unit, and receives the communication frame addressed to the end device from the intermediate device. Besides, the frame transmission/receiving unit transmits the routing frame created by the routing frame processing unit and receives the routing frame from the intermediate device.

The routing frame comprises a header including the media access control address, a header including a logical link control address which indicates the logical link procedure among the end devices, and a protocol field.

The routing frame processing unit creates a routing table which makes the mapping of the received media access control address and the network entity title of the another intermediate device, and the network address of the end device of the destination corresponding one another.

The protocol field of the routing frame and the communication frame comprises a network layer protocol identifier for identifying that the frame is either the communication frame or the routing frame, and the network address or the network entity title.

The routing frame processing unit is provided with an address rewriting unit. The address rewriting unit rewrites the media access control address and the network entity title of the intermediate device intermediating to the end device of the destination into the address which indicates another intermediate device.

The method for traffic distribution of the present invention transmits and receives a communication frame and a routing frame by the end device connected to each of the plural networks, and distributes the traffic volume of the each intermediate device by intermediating the communication frame and forwarding the routing frame by a plurality of intermediate devices which connect the plurality of networks one another.

The method for traffic distribution comprises a receiving step, a detection step, a routing frame processing step, and a transmission step.

The receiving step is to receive a communication frame and a routing frame transmitted from the transmission source.

The detection step is to detect the traffic volume of the frame transmitted to the destination.

The routing frame processing step creates the frame including the media access control address that indicates the access point in which the intermediate device is connected to the network, and the network entity title which indicates the address allocated to the intermediate device so as to inform the frame as the routing frame to the transmission source. The routing frame processing step creates the routing frame that indicates another intermediate device when the traffic volume exceeds the prescribed value.

The transmission step transmits the communication frame received by the receiving step and transmits the routing frame which indicates the another intermediate device to the transmission source.

Further, the method for traffic distribution of the present invention comprises a communication frame processing step, a routing frame processing step, and a frame transmission/receiving step. The communication frame processing step generates a communication frame to be transmitted and processes the communication frame it received.

The frame transmission/receiving step receives the routing frame including the media access control address and the network entity title of the each intermediate device, and transmits the communication frame and the routing frame to the intermediate device after receiving the routing frame that indicates the another intermediate device.

The routing frame processing step manages the media access control address and the network entity title received by the frame transmission/receiving step. The routing frame processing step generates the routing frame including the media access control address and the network address of the intermediate device.

The frame transmission/receiving step transmits the frame to the intermediate device indicated by the routing frame after receiving the routing frame.

The routing frame processing step comprises a creation step and an address rewriting step.

The creation step creates the routing table that manages the media access control address and the network address of the end device and the media access control address and the network entity title of the intermediate device received by the frame transmission/receiving step.

The address rewriting step rewrites the destination media address of the frame to be transmitted into the media access control address of the intermediate device indicated by the routing frame.

The communication frame and the routing frame comprise a header including the media access control address, a header including the logical link control address that indicates the logical link procedure between the transmission source and the destination, and a protocol field.

The routing frame processing step creates the routing table which makes the received media access control address and the network entity title of the another intermediate device, and the network address of the end device of the destination corresponding one another.

The protocol field comprises a network layer protocol identifier for identifying that the frame is either the communication frame or the routing frame, and the network entity title or the network address.

The routing frame processing step includes an address rewriting step which rewrites the address into the address of the intermediate device suitable for transmitting the communication frame to one end device within the routing table.

Further, the intermediate device of the present invention comprises a receiving unit, a detection unit, a routing frame processing unit and a transmission/receiving unit.

The receiving unit receives the communication frame and the routing frame transmitted through the network from the end device of the transmission source. The detection unit detects the traffic volume of the frame transmitted to the network of the destination which will be connected to the end device of the destination.

The routing frame processing unit creates the frame including the media access control address that indicates the access point in which the intermediate device is connected to the network, and the network entity title which indicates the address allocated to the intermediate device so as to inform the frame as the routing frame to the end device of each network.

The routing frame processing unit creates a routing frame that indicates another intermediate device when the traffic volume exceeds the prescribed value.

The transmission unit transmits the frame received by the receiving unit to the end device of the destination and transmits the routing frame that indicates another intermediate device from the routing frame processing unit to the end device of the transmission source when the traffic volume of the network of the destination exceeds the prescribed value.

Further, the end device of the present invention comprises a communication frame processing unit, a routing frame processing unit and a frame transmission/receiving unit. The communication frame processing unit generates a communication frame to be transmitted and processes the communication frame it received.

The frame transmission/receiving unit receives the routing frame including the media access control address that indicates the access point in which the each intermediate device is connected to each network, and the network entity title that indicates the address allocated to each intermediate device.

The frame transmission/receiving unit receives the routing frame which indicates another intermediate device, and transmits the communication frame and the routing frame to each of the intermediate devices.

The routing frame processing unit manages the media access control address and the network entity title of each intermediate device received by the frame transmission/receiving unit.

The frame transmission/receiving unit transmits the frame to the intermediate device indicated by the routing frame after receiving the routing frame.

According to the system for traffic distribution of the present invention, the detection unit detects the traffic volume passing to the destination whenever the transmission unit transmits the frame to the network, after the intermediate device receives the frame from the end device.

The routing frame processing unit creates the routing frame including the media access control address that indicates the access point in which the intermediate device is connected to the network and the network entity title that indicates the address allocated to the intermediate device, and informs the routing frame to the end device.

Besides, the routing frame processing unit rewrites the media access control address and the network entity title of the intermediate device when the traffic volume passing to the destination exceeds the prescribed value.

Namely, the routing frame processing unit creates the routing frame including the media access control address that indicates another intermediate device and the network entity title.

Further, the transmission unit transmits the routing frame that indicates another intermediate device to the end device to which the frame is transmitted, when the traffic volume exceeds the prescribed value.

The frame transmission/receiving unit receives the routing frame, and the routing frame processing unit rewrites the media access control address and the network entity title into the address of the intermediate device indicated by the routing frame. The communication frame to be transmitted by the frame transmission/receiving unit is transmitted to the intermediate device indicated by the routing frame.

As a result, the end device communicates through another intermediate device when the traffic volume of the network is increased. For this reason, the traffic distribution can be executed dynamically.

DETAILED DESCRIPTION OF THE PREFERRED EMBODIMENT

The embodiments of the system for traffic distribution and the method for traffic distribution of the present invention will be explained as follows.

Embodiment 1

Figure 1:
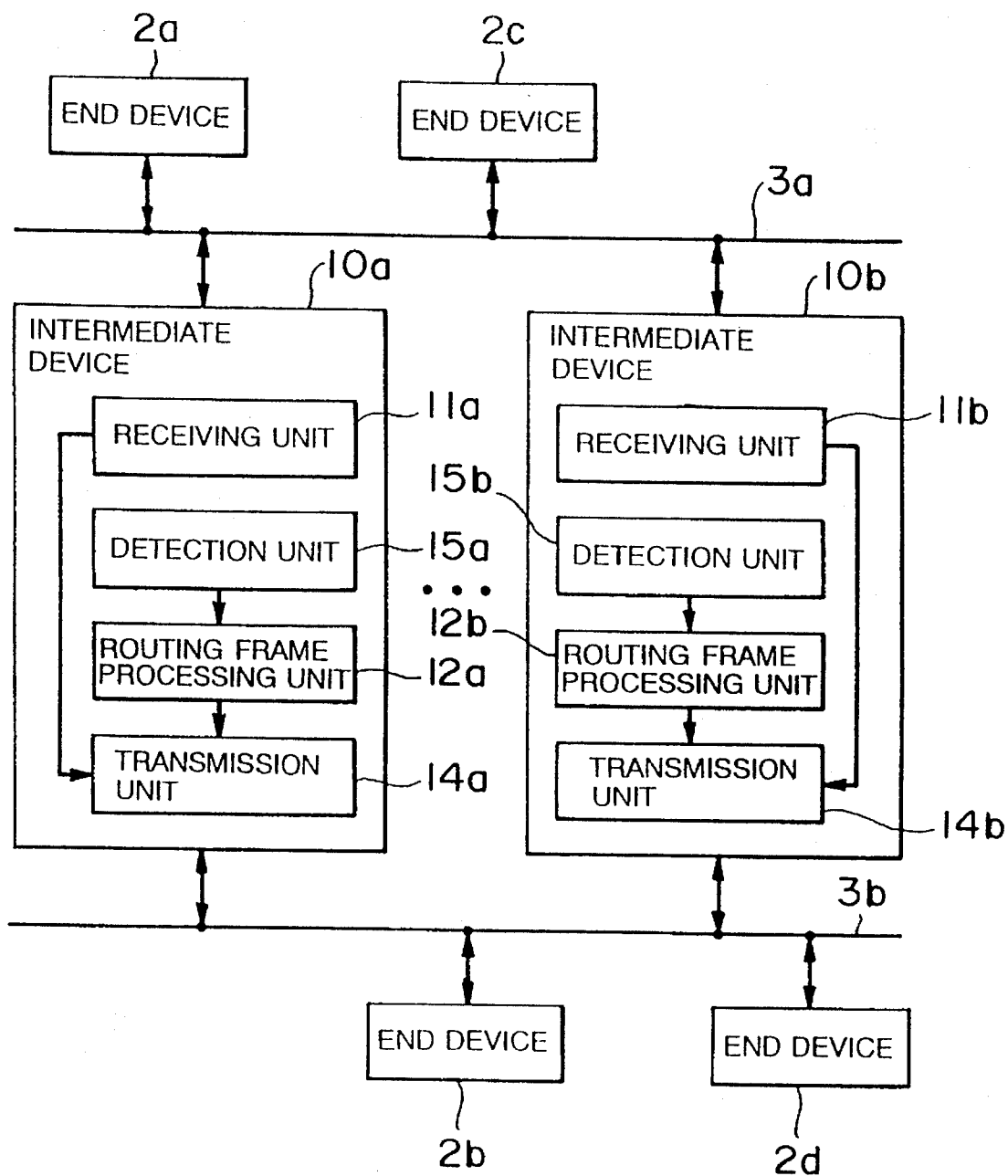
FIG. 1 is a configuration block diagram indicating a system for traffic distribution in accordance with the embodiment 1 of the present invention.

FIG. 1 is a configuration block diagram which indicates the system for traffic distribution in accordance with the embodiment 1 of the present invention. The system for traffic distribution comprises two networks 3a, 3b, four end devices 2a–2d and two intermediate devices 10a, 10b.

In the embodiment 1 and the embodiment 2 shown below, the end device is also referred to as the end system; ES, and the intermediate device is also referred to as the intermediate system; IS.

The end devices 2a, 2c are connected to the network 3a, and transmit and receive a communication frame and a routing frame. The end devices 2b, 2d are connected to the network 3b, and transmit and receive the communication frame and the routing frame.

The intermediate devices 10a, 10b intermediate the communication frame and receive the routing frame transmitted from the networks 3a, 3b.

The intermediate device 10a comprises a receiving unit 11a, a detection unit 15a, a routing frame processing unit 12a, and a transmission unit 14a. The intermediate device 10b comprises a receiving unit 11b, a detection unit 15b, a routing frame processing unit 12b and a transmission unit 14b.

The receiving units 11a, 11b receive the communication frame and the routing frame transmitted from the end device of the transmission source within the four end devices.

The detection units 15a, 15b detect the traffic volume of the frame transmitted to each network by the intermediate device. The routing frame processing units 12a, 12b are connected to the detection units 15a, 15b.

The routing frame processing units 12a, 12b create the frame including a media access control address which indicates the access point in which the intermediate device as the routing frame is connected to the network, and the network entity title which indicates the address allocated to the intermediate device.

The routing frame processing units 12a, 12b inform the routing frame to the end device of each network.

The routing frame processing units 12a, 12b create the routing frame which indicates another intermediate device when the traffic volume exceeds the prescribed value.

The transmission units 14a, 14b transmit communication the frame received by the receiving units 11a, 11b to the end device of the destination. The transmission units 14a, 14b transmit the routing frame which indicates another intermediate device from the routing frame processing unit to the end device of the transmission source, when the traffic volume exceeds the prescribed value.

Hereupon, the end devices 2a–2d, for instance, are workstations, host computers and so on. The intermediate devices 10a, 10b, for instance, are the routers and so on. The networks 3a, 3b, for instance, are LAN. WAN can be used for the networks 3a, 3b in place of LAN. The networks 3a, 3b can be replaced with other networks.

Further, the routing frame processing unit 12 receives from the receiving unit 11 the media access control address which indicates the access point in which the end device is connected to the network from each end device of each network, and the network address which indicates the address allocated to the end device.

Figure 2:
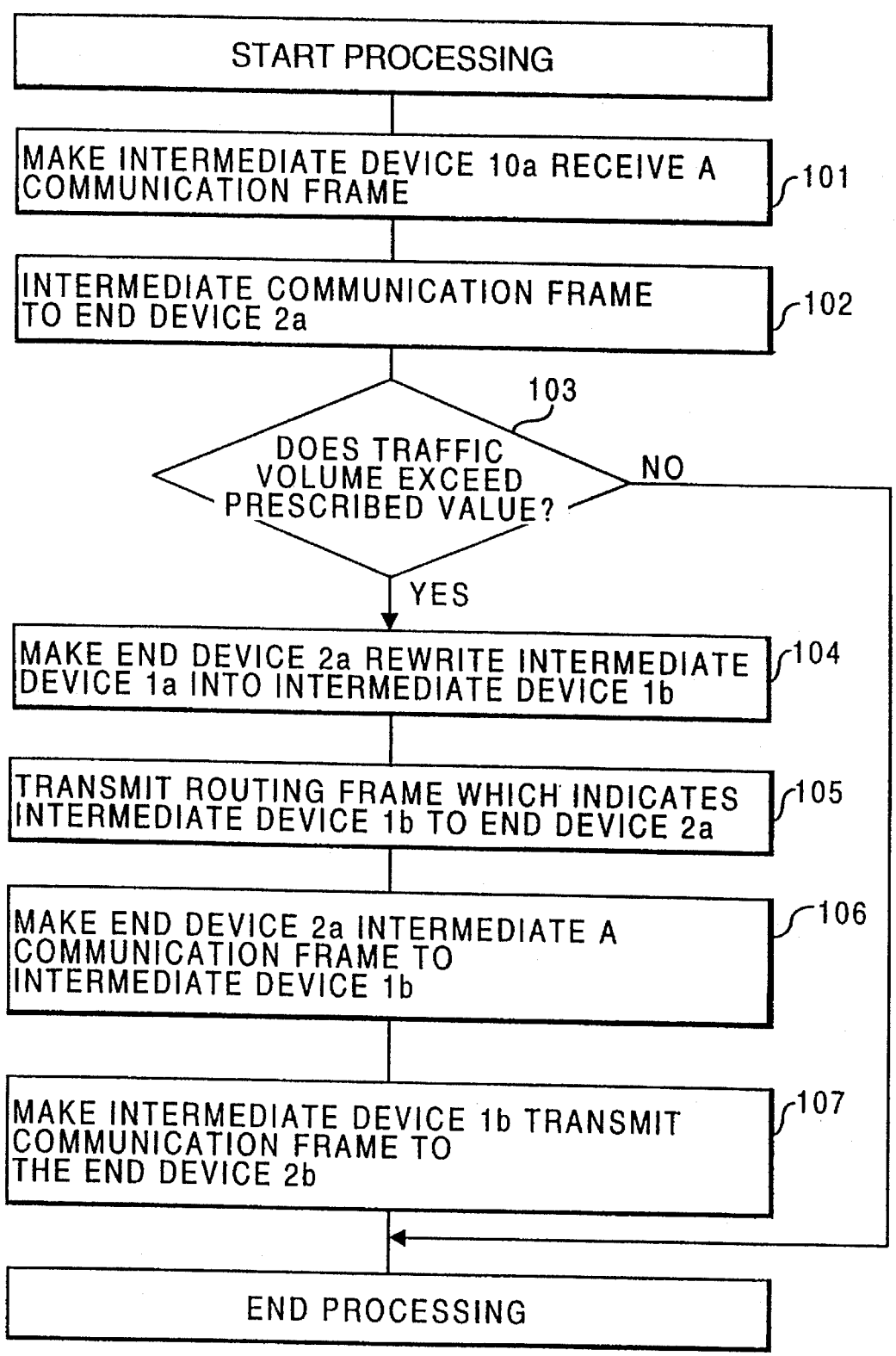
FIG. 2 is a flowchart indicating a method for traffic distribution in accordance with the embodiment 1 of the present invention.

Then, the method for traffic distribution in accordance with the embodiment 1 of the present invention will be explained. FIG. 2 is the flowchart indicating the method for traffic distribution in accordance with the embodiment 1 of the present invention.

First of all, each of the routing frame processing units 12a, 12b creates the routing frame including the media access control address and the network address in advance, and transmits the routing frame to each of the end devices 2a–2d.

Then, for instance, in the intermediate device 10a, the receiving unit 11a receives the communication frame from the end device 2a (Step 101). The detection unit 15a detects the traffic volume of the network 3b whenever the transmission 14a transmits the communication frame to the network 3b (Step 102).

Then the routing frame processing unit 12a judges whether the traffic volume exceeds the prescribed value (Step 103).

The routing frame processing unit 12a creates the routing frame including the media access control address which indicates another intermediate device and the network entity title, when the traffic volume exceeds the prescribed value. For instance, the routing frame processing unit 12a rewrites the intermediate device 10a which transmits the communication frame from the device 2a into the intermediate device 10b (Step 104).

Besides, the transmission unit 14a transmits the routing frame that indicates another intermediate device 10b to the end device 2a to which the communication frame was transmitted (Step 105).

The end device 2a transmits the communication frame to be transmitted to the intermediate device 10b indicated by the routing frame after receiving the routing frame (Step 106).

The intermediate device 10b transmits the communication frame to the end device 2b through the network 3b (Step 107).

The end device 2a communicates through another intermediate device 10b when the traffic volume of the network 3b exceeds the prescribed value. For this reason, the traffic distribution can be executed dynamically.

Embodiment 2

Figure 3:
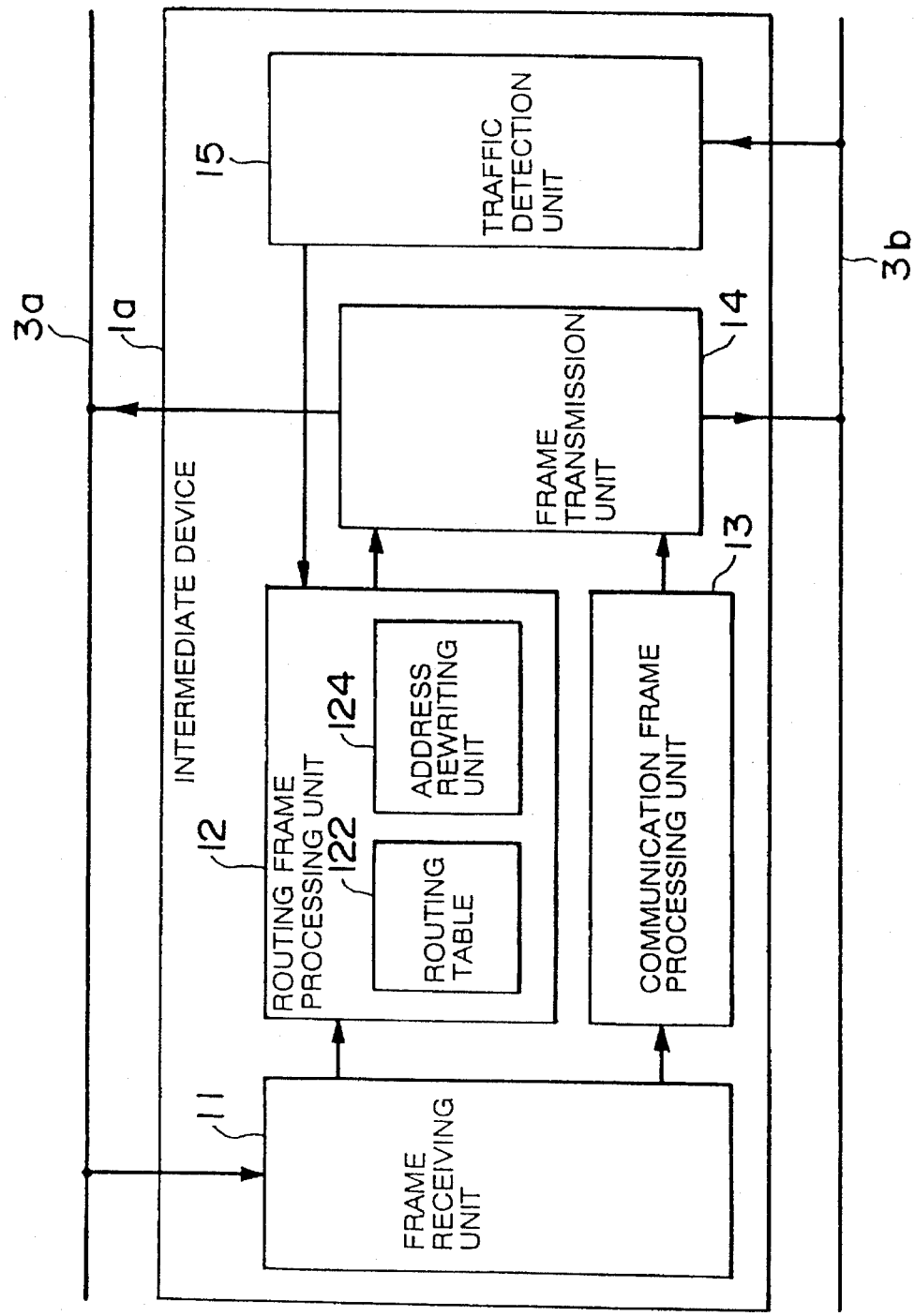
FIG. 3 is a configuration block diagram indicating a intermediate device in the embodiment 2 of the present invention.

The embodiment 2 of the present invention will be explained. FIG. 3 is the configuration block diagram which indicates the intermediate device of the system for traffic distribution in accordance with the embodiment 2 of the present invention.

The configuration of the intermediate device 1a is shown in FIG. 3. Two intermediate devices 1a, 1b connected to the networks 3a, 3b are provided in the embodiment 2. Though the intermediate device 1b is not illustrated, the configuration of the intermediate device 1b is the same as the configuration of the intermediate device 1a.

The intermediate devices 1a, 1b are different from the intermediate devices 10a, 10b of the embodiment 1. Other configurations except the configuration of the intermediate devices 1a, 1b are the same as the configuration of the embodiment 1. The same parts will be explained by adding the identical sign to them.

The intermediate devices 1a, 1b comprise a frame receiving unit 11, a routing frame processing unit 12, a communication frame processing unit 13, a frame transmission unit 14 and a traffic detection unit 15.

The frame receiving unit 11 receives the frame from the end device 2a or the end device 2b through the network 3a. The frame receiving unit 11 discriminates the type of frames it received, that is, whether the frame is a routing frame or a communication frame.

The frame receiving unit 11 outputs the frame to the routing frame processing unit 12 when the frame is the routing frame. The frame receiving unit 11 outputs the frame to the communication frame unit 13 when the frame is the communication frame.

The traffic detection unit 15 is connected to the routing frame processing unit 12. The traffic detection unit 15 detects whether the traffic volume of the frame transmitted to the network 3b by the intermediate device exceeds the prescribed value (threshold value).

For instance, the traffic detection unit 15 detects that the buffer has overflowed. The traffic detection unit 15 counts the number of times the network protocol data unit (hereinafter referred to as NPDU)is transmitted per fixed time.

The routing frame processing unit 12 controls the routing protocol. Hereupon, the routing frame processing unit 12 creates the routing frame including the media access control (MAC) address which indicates the access point in which the intermediate device is connected to the networks 3a, 3b and the network entity title which indicates the address allocated to the intermediate device.

The routing frame processing unit 12 outputs the routing frame to the frame transmission/receiving unit 14.

Further, the routing frame processing unit 12 receives the routing frame including the MCA address which indicates the access point in which each of the end devices is connected to the networks 3a, 3b and the network address which indicates the address allocated to the end device.

The routing frame processing unit 12 creates the routing table which makes the media access control address, the network address and the port (network port) corresponding one another.

The routing frame processing unit 12 creates the routing frame which indicates another intermediate device when the traffic volume exceeds the prescribed value.

The routing table 122 has some information which indicates that the intermediate device should intermediate to the end device of one last target or another intermediate device should intermediate. Hereinafter the information is referred to as intermediate information.

For instance, the intermediate device 1a intermediates the frame addressed to the end device 2b. The intermediate device 1b intermediates the frame addressed to the end device 2d. The intermediate information is defined in advance or determined by another method (for instance, using the routing protocol).

The routing frame processing unit 12 is provided with the address rewriting unit 124 which rewrites the intermediate information of the routing table 122.

The communication frame processing unit 13 checks the control of the communication frame, for instance, the communication frame it received. The communication frame processing unit 13 prompts the frame transmission unit 14 to transmit the communication frame, selecting the port to be transmitted from the routing table 122.

The frame transmission unit 14 is connected to the routing frame processing unit 12 and the communication frame unit 13. The frame transmission unit 14 transmits the communication frame received by the frame receiving unit 11 to the end device of the destination.

The frame transmission unit 14 transmits the routing frame from the routing frame processing unit 12 to the end device when the traffic volume exceeds the prescribed value.

Further, the frame transmission unit 14 transmits the routing frame including the MAC address and the network entity title of the intermediate device created by the routing frame processing unit 12 to each of the end devices.

The format of the routing frame is regulated so that each frame will be suitable for the network of the destination. For instance, the MAC header is attached to the routing frame.

Figure 4:
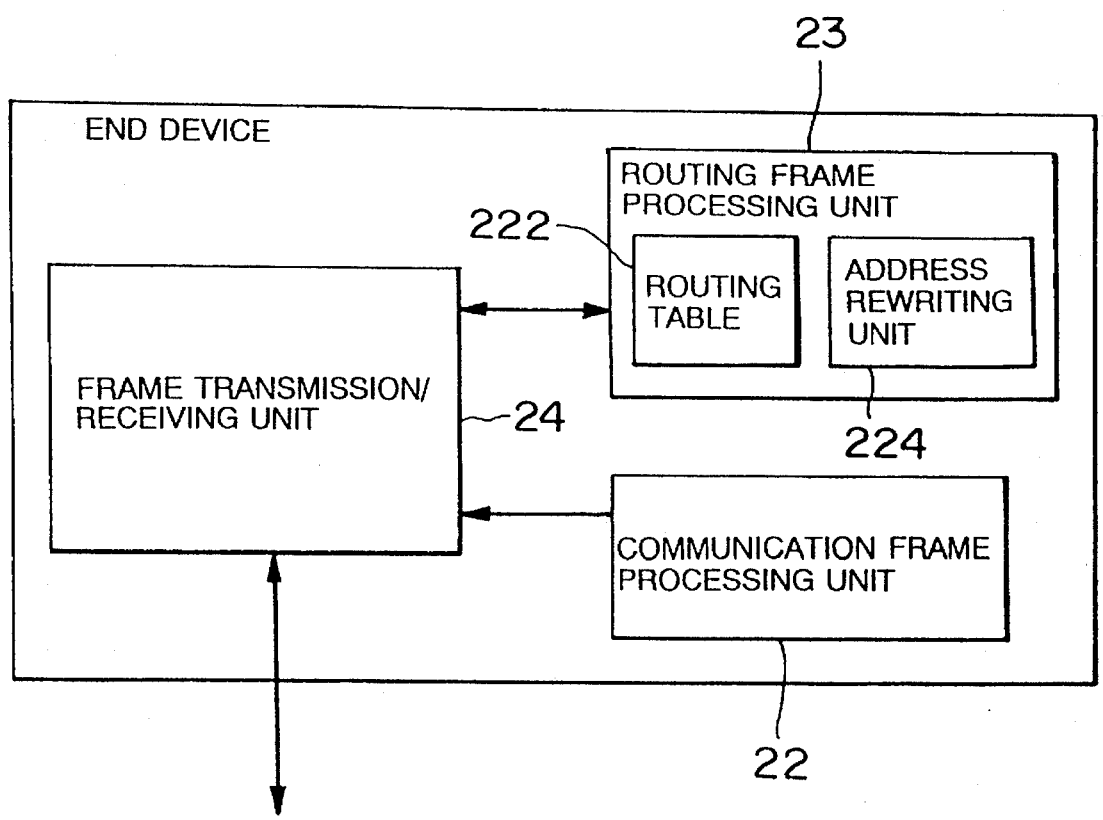
FIG. 4 is a configuration block diagram indicating an end device of the embodiment 2.

FIG. 4 is the configuration block diagram which indicates each end device. Each of end devices 2a–2d comprises a communication frame processing unit 22, a routing frame processing unit 23 and a frame transmission/receiving unit 24. The communication frame processing unit 22 and the routing frame processing unit 23 are connected to the frame transmission/receiving unit 24.

The communication frame processing unit 22 generates the communication frame and processes the communication frame received by the frame transmission/receiving unit 24.

The routing frame processing unit 23 transmits the control of the routing protocol, for instance, the frame including the media access control address which indicates the access point in which the end device is connected to the network, and the network address which indicates the address allocated to the end device.

The routing frame processing unit 23 receives the routing frame including the media access control address and the network address of another intermediate device from the frame transmission/receiving unit 24, and creates the routing table 222.

The routing table 222 has some information that indicates the intermediate device to which the communication frame is transmitted. The routing frame processing unit 23 has an address rewriting unit 224 which rewrites the information into the address of the intermediate device indicated by the routing frame, when the routing frame is received from the frame transmission/receiving unit 24.

The frame transmission/receiving unit 24 transmits the routing frame created by the routing frame processing unit 23 and the communication frame created by the communication frame processing unit 22.

Besides, the frame transmission/receiving unit 24 receives the frame from another intermediate device. The frame transmission/receiving unit 24 outputs the frame to the communication frame processing unit 22 when the frame is the communication frame. The frame transmission/receiving unit 24 outputs the frame to the routing frame processing unit 23 when the frame is the routing frame.

Figure 5:
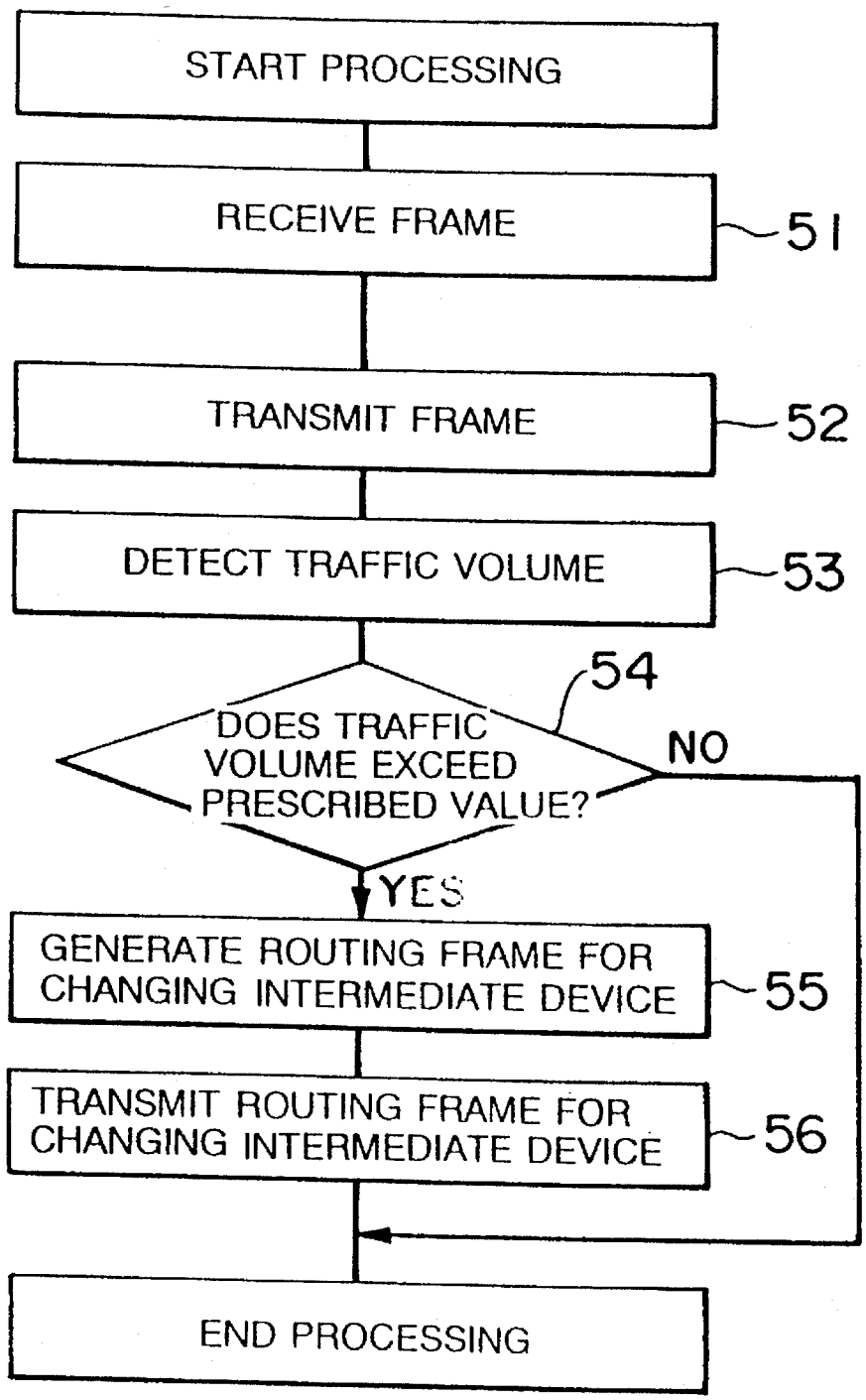
FIG. 5 is the flowchart indicating the operation of the intermediate device of the embodiment 2.
Figure 6:
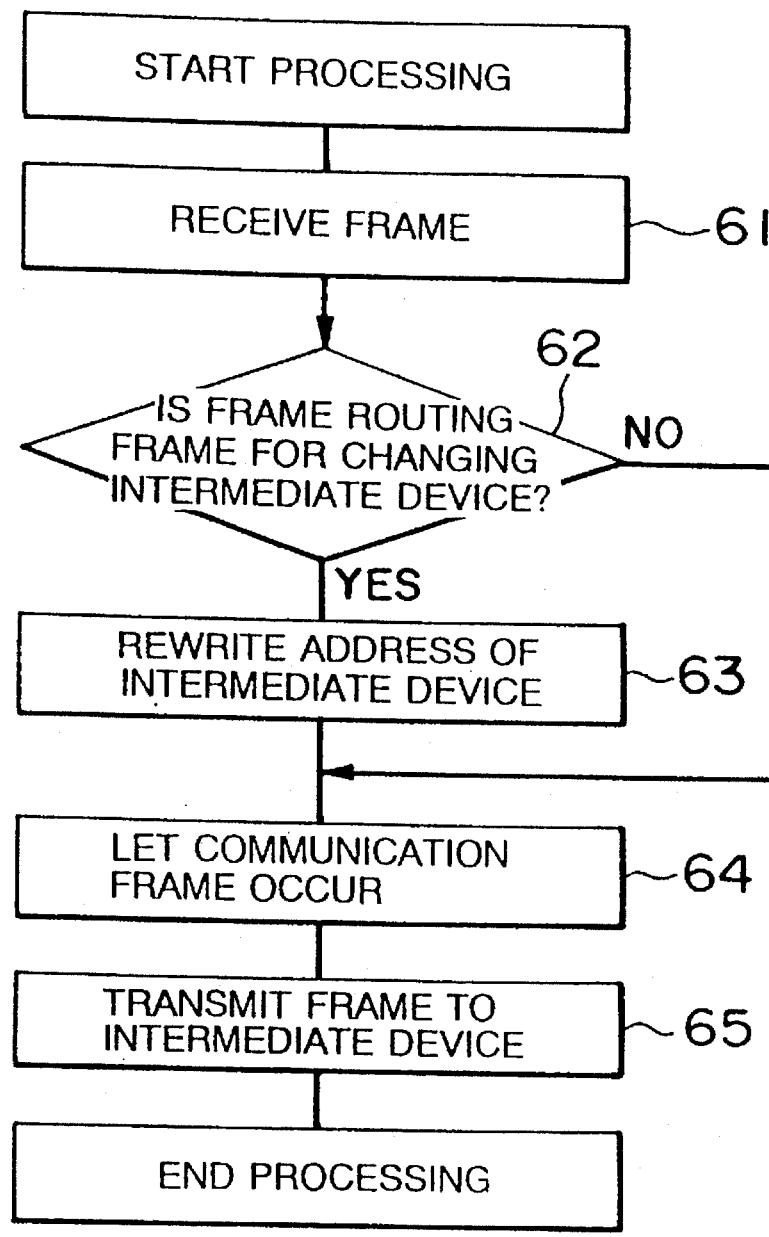
FIG. 6 is the flowchart indicating the operation of the end device of the embodiment 2.

Then, the method for traffic distribution will be explained by using the flowchart shown in FIG. 5 and FIG. 6. First of all, the operation of the intermediate device will be explained by using FIG. 5.

Hereupon, the intermediate device 1a receives the communication frame to be transmitted from the end device 2a connected to the network 3a to the end device 2b connected to the network 3b. Besides, the intermediate device 1a detects that traffic volume of the network 3b exceeds the prescribed value when the frame is transmitted to the network 3b by the intermediate device 1a.

First of all, for instance, the frame receiving unit 11 within the intermediate device 1a receives the frame from the end device 2a connected to the network 3a (Step 51).

Then the frame receiving unit 11 outputs the communication frame to the communication frame processing unit 13 after discriminating that the received frame is the communication frame.

The communication frame processing unit 13 checks the communication frame. The communication frame processing unit 13 determines the transmission port by referring to the routing table 122, and transmits the communication frame to the frame transmission unit 14.

The frame transmission unit 14 transmits the communication frame to the network 3b (Step 52).

Further, the traffic detection unit 15 detects the traffic volume transmitted from the intermediate device 1a to the network 3b (Step 53). The traffic detection unit 15 detects that the traffic volume exceeds the prescribed value, and informs the detection result to the routing frame processing unit 12 (Step 54).

Further, the routing frame processing unit 12 creates the routing frame that indicates another intermediate device by the information of the traffic detection unit 15 (Step 55). The routing frame processing unit 12 prompts the frame transmission unit 14 to transmit the routing frame to the network 3a.

The frame transmission 14 transmits the routing frame which indicates another intermediate device to the network 3a (Step 56).

Then, the operation of the end device will be explained by referring to FIG. 6. First of all, the frame receiving unit 24 judges whether the frame is a routing frame or a communication frame after receiving the frame (Step 61).

The routing frame is transmitted to the routing frame processing unit 23 when the frame is a routing frame. The routing frame processing unit 23 judges whether the routing frame is a routing frame for changing the intermediate device, after receiving the routing frame (Step 62).

The address rewriting unit rewrites the information stored in the routing table 222 when the frame is the routing frame for changing the intermediate device.

Namely, the address rewriting unit 224 rewrites the information which indicates the intermediate device to which the communication frame is transmitted, from "1a" already set up to "1b" (Step 63).

After that, the communication frame processing unit 22 outputs the communication frame to the frame transmission/receiving unit 24 when the communication frame processing unit 22 generates a communication frame (Step 64). And the frame transmission/receiving unit 24 transmits the communication frame to the intermediate device 1b indicated by the routing frame referring to the routing table 222 (Step 65).

As a result, the traffic distribution can be executed dynamically, since the end device 2a communicates through another intermediate device 1a when the traffic volume passing to the network 3b is increased.

Then, the routing frame processing units 12, 23 will be explained more concretely. ES-IS protocol unit will be used as one example of the routing frame processing units. CLNP (ISO 8473 Connection-less Network Protocol) will be used as one example of the communication frames.

ES-IS PROTOCOL

ES-IS protocol is one of the "protocols of OSI(Open Systems Interconnection)" conventionalized by ISO (International Standardized Organization). The communication among the different types of end devices on the network is realized by the OSI.

ES-IS protocol will be explained as follows.

The ISO number of the ES-IS protocol is ISO 9542. The proper title of the ES-IS protocol is Information processing Systems -End system in conjunction with the Protocol for providing the connectionless-mode network service (ISO 8473).

The ES-IS protocol unit set on the intermediate devices 1a, 1b recognizes the MAC address and the NSAP address of the end devices 2a–2d automatically.

The MAC address and the network address of the end devices can be defined automatically when the ES-IS protocol unit is used.

The ES-IS protocol unit intermediates the DT NPDU it received to another intermediate device when the intermediate devices 1a, 1b receive a DT NPDU (data network protocol data unit), and another intermediate device is more suitable for intermediating the DT NPDU than the intermediate device is.

Further, the ES-IS protocol unit informs the end device which transmitted the DT NPDU to transmit the DT NPDU to another intermediate device after that.

The ES-IS protocol unit transmits a RD PDU (Route Redirect PDU) including the information which indicates the most suitable device to the end device. Consequently, the end device can communicate in the most suitable route since the DT NPDU is transmitted for the second time.

Then, the ES-IS protocol units set on the end devices 2a–2d recognize the MAC address and the network entity title of the intermediate devices 1a, 1b automatically.

The ES-IS protocol unit recognizes that another intermediate device is more suitable than the intermediate device when each of the end devices 2a–2d receives the RD PDU from the intermediate devices 1a, 1b. The ES-IS protocol unit transmits the DT NPDU to the another intermediate device. Consequently, the intermediate device can communicate in the most suitable route since the DT NPD is transmitted for the second time.

The end device judges that the intermediate device is not capable of communicating when the end device stops receiving the regular information (ISH PDU) from one intermediate device. The end device stops transmitting the DT NPDU to the intermediate device.

Namely, the DT NPDU is transmitted towards another intermediate device when another intermediate device is on the same subnetwork. Consequently, the intermediate device is switched automatically when there are a plurality of intermediate devices on the subnetwork.

Then, the routing frame processing units 12, 23 of the intermediate devices 1a, 1b and the end devices 2a–2d will be explained in more detail.

Figure 7:
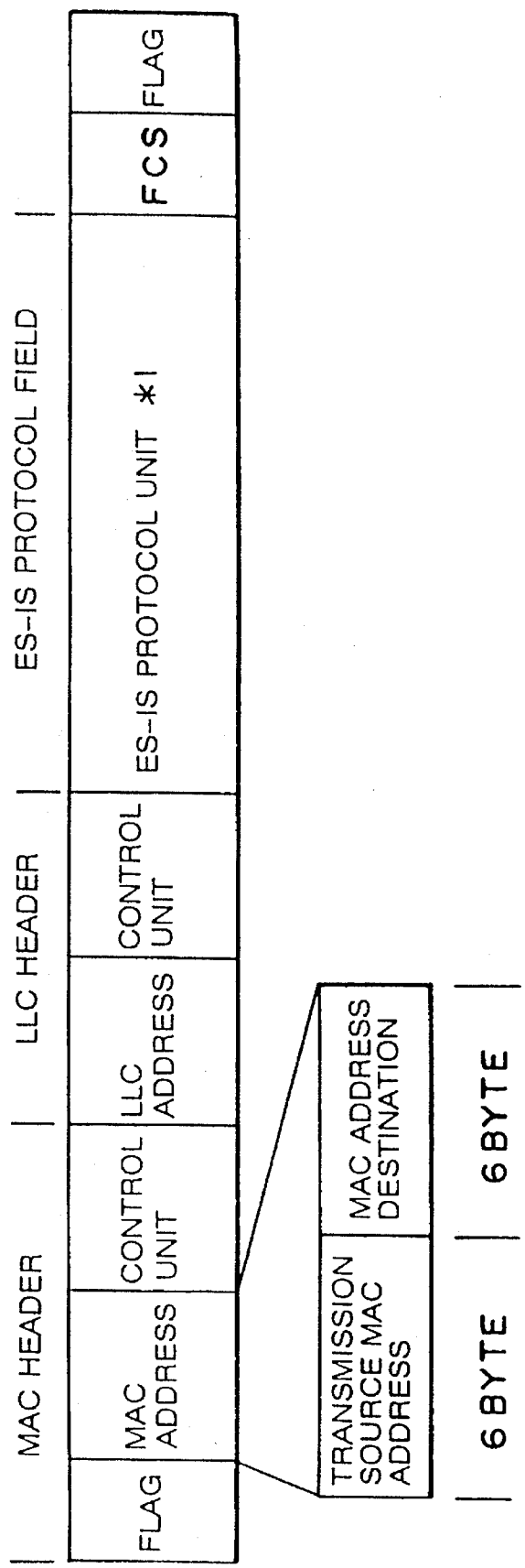
FIG. 7 is a diagram indicating a format of ISH PDU.

(a) First of all, the operation of the routing frame processing unit 12 within the intermediate devices 1a, 1b will be explained. FIG. 7 is a diagram indicating the format of the ISH PDU (IS Hello PDU). As shown in FIG. 7, the ISH PDU comprises a MAC header, a LLC (logical link control) header, a ES-IS protocol field, a FCS (frame check sequence) and a flag.

The MAC header comprises a flag, a MAC address which controls the access of the end device and the intermediate device to the network, and a control unit. The MAC address comprises six bytes of transmission source address and six bytes of destination MAC address.

Figure 8:
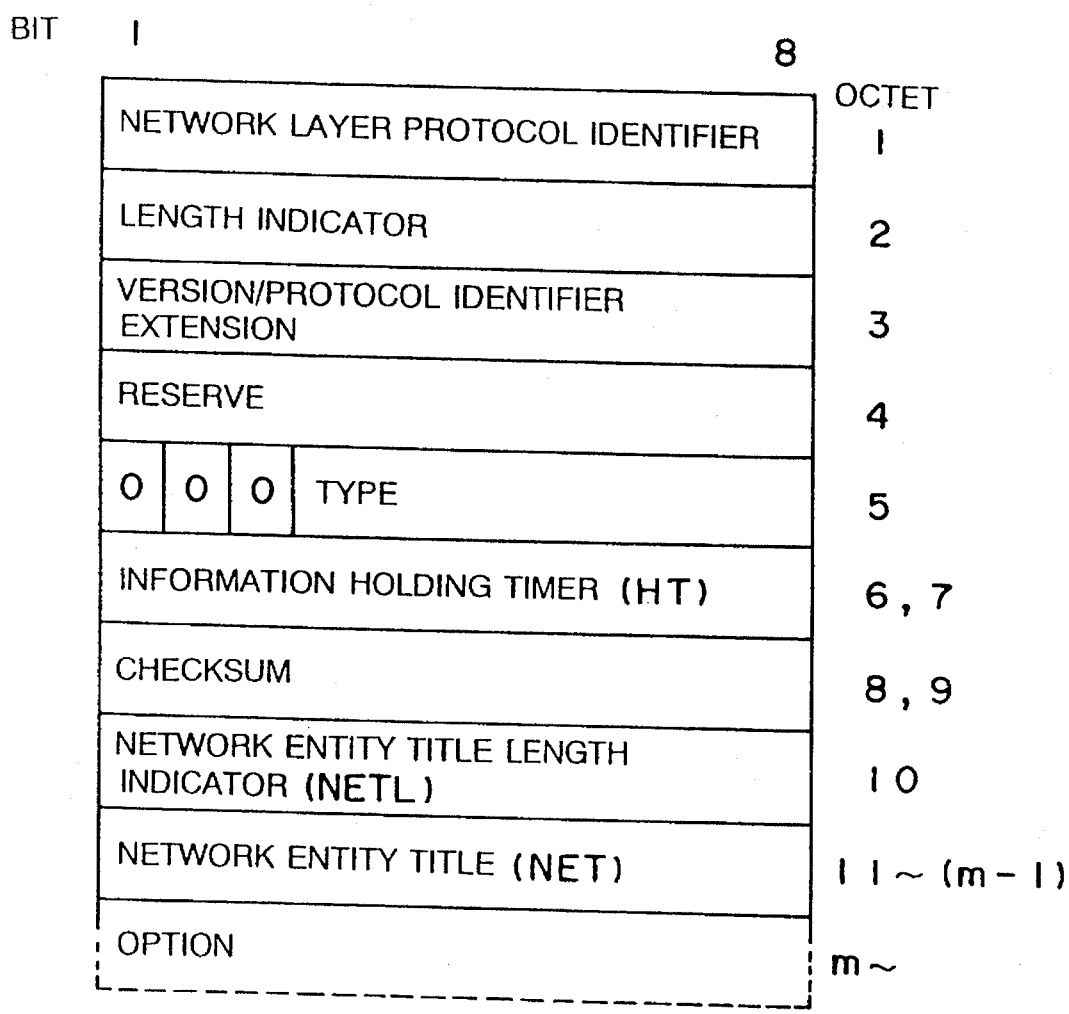
FIG. 8 is a diagram indicating a format of ES-IS protocol field of ISH PDU.

The LLC header comprises a LLC address which controls the logical combination among the devices to be transmitted, and a control unit. The ES-IS protocol field is configured as shown in FIG. 8.

The format of The ES-IS protocol field comprises a network layer protocol identifier, a length indicator, a version/protocol identifier extension, a reserve and a type.

The length indicator is the value that indicates the whole length of the PDU. The network layer protocol identifier is the value that indicates the ES-IS protocol and the identifier that identifies that the frame is either a communication frame or the routing frame. The value of the version/protocol identifier extension is, for instance, x"01". The value of the reserve is, for instance, x"00". The type indicates the ISH and its value is B "00100".

Further, the format of the ES-IS protocol field comprises a information holding timer, a checksum, a network entity title indicator NETL, a network entity title NET and an option.

The information holding timer is the value that indicates the effective time of the PDU. The option is the value that indicates the parameters such as a security and a degree of priority.

The routing frame processing unit 12 transmits the ISH PDU shown in FIG. 7 regularly, for instance, once per three minutes. The ISH PDU is transmitted to indicate that the intermediate device operates on the subnetworks to all of the end devices 2a–2d connected to the identical subnetworks (for instance, LAN).

Further, the ISH PDU transmits the "MAC address value" and the "network entity title value" of the intermediate device.

The end devices 2a–2d receive the ISH PDU. The end devices 2a–2d recognize that the intermediate devices 1a, 1b are not capable of communicating when the end devices 2a–2d stop receiving the ISH PDU to be transmitted from the intermediate devices 1a, 1b.

Then the routing frame processing unit 12 transmits the RD (route redirect) PDU to the end device to which the DT NPDU was transmitted, when the intermediate devices 1a, 1b receive the DT NPDU from the end devices 2a–2d, and another intermediate device is more suitable than the intermediate device.

The routing frame processing unit 12 informs the end device to which the DT NPDU was transmitted to transmit the DT NPDU to the another intermediate device after that.

(b) Then, the operation of the routing frame processing unit 23 within the end device will be explained.

Figure 9:
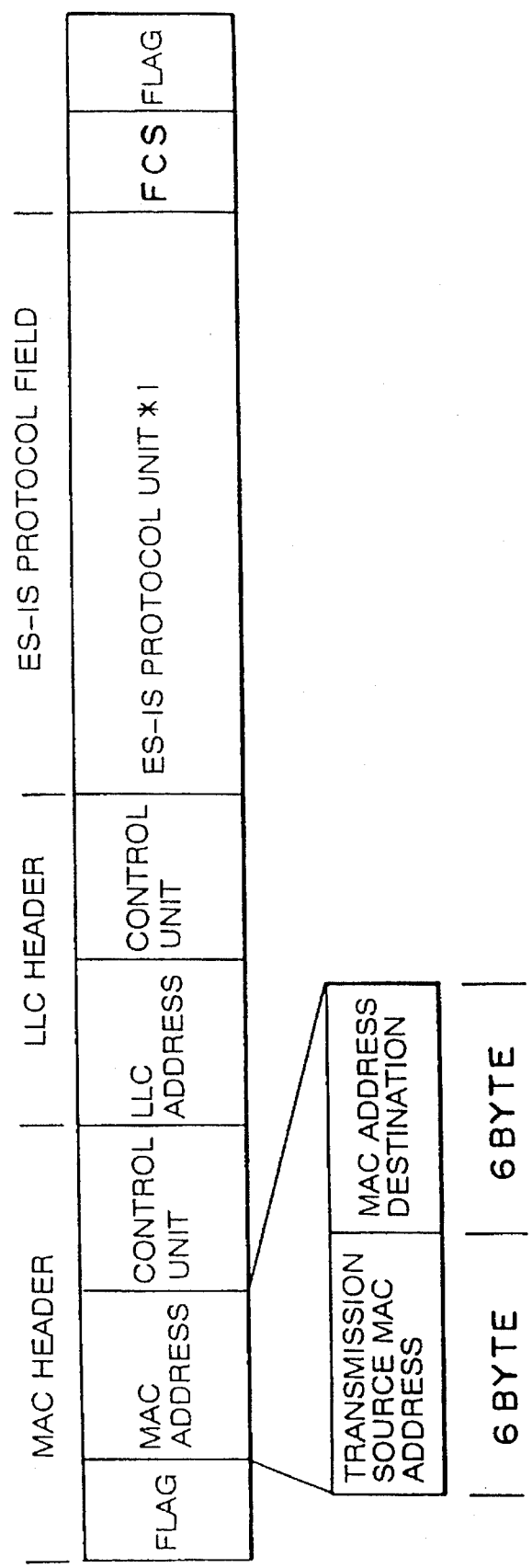
FIG. 9 is a diagram indicating a format of ESH PDU.

FIG. 9 is a diagram indicating the format of the ESH PDU. In the format configuration of the ESH PDU, the configuration of the ES-IS protocol field is different from the configuration of the ISH PDU shown in FIG. 7. Consequently, other configurations are the same as the configurations of the ISH PDU shown in FIG. 7, so the explanation about the same configurations will be omitted.

Figure 10:
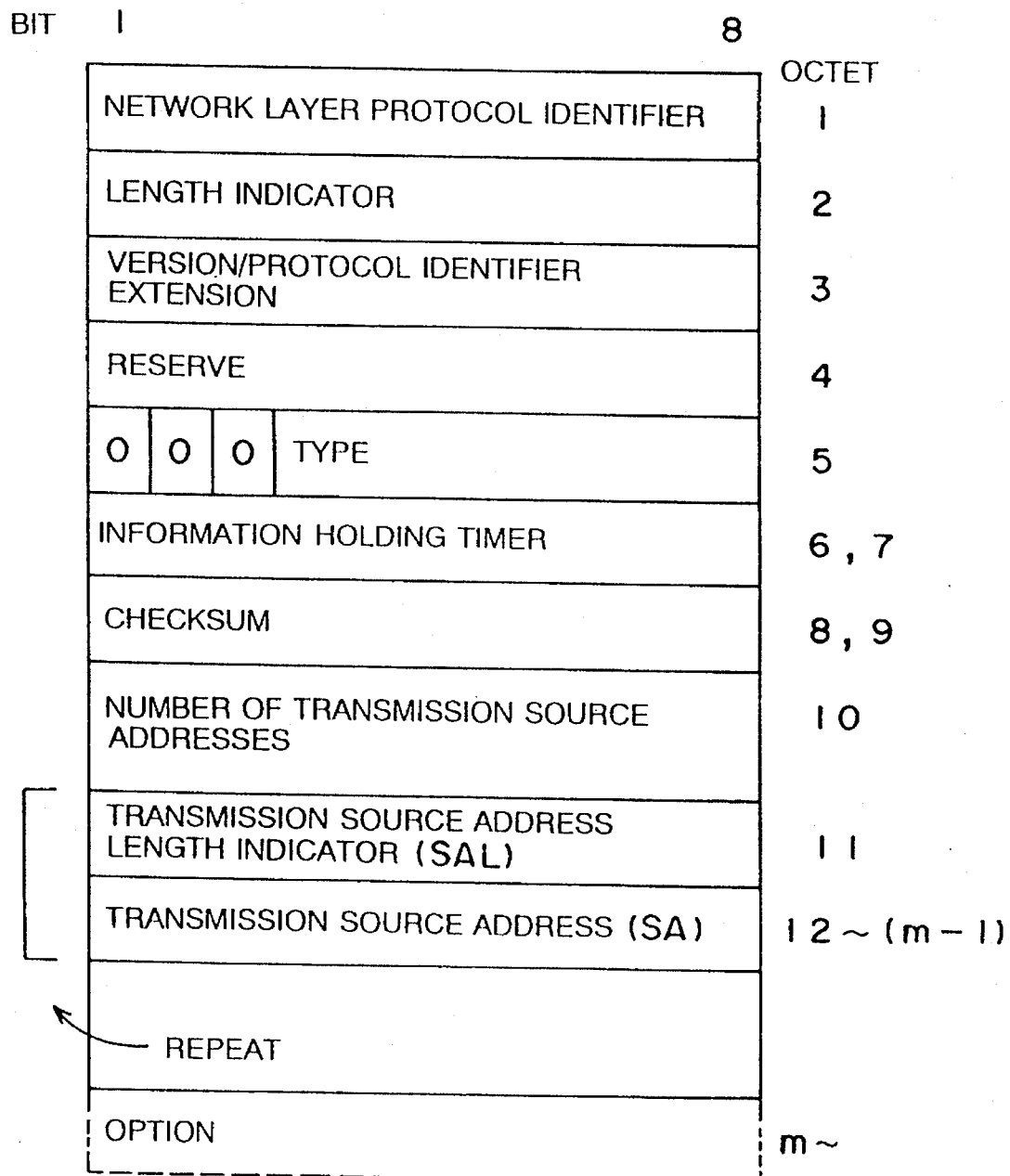
FIG. 10 is a diagram indicating a format of ES-IS protocol field of ESH PDU.

FIG. 10 is a diagram indicating the format configuration of the ES-IS protocol field. The format of the ES-IS protocol field comprises a network layer protocol identifier, a length indicator, a version/protocol identifier expansion, a reserve and a type.

The network layer protocol identifier is the identifier which identifies that the frame is either a communication frame or the routing frame. The value of the version/protocol identifier extension is, for instance, x"01". The value of the reserve is, for instance, x"00". The type indicates the ESH, and its value is B "00010".

The format of the ES-IS protocol field comprises a information holding timer, a checksum, the number of transmission source addresses, a transmission source address length indicator SAL, a transmission address SA and an option.

The number of the transmission source addresses is the number of the network addresses maintained by the end device.

The routing frame processing unit 23 transmits the ESH PDU (ES Hello PDU) regularly, for instance, once per three minutes. The ESH PDU is transmitted to indicate that the end device operates on subnetworks to all of the intermediate devices 1a, 1b connected to the identical subnetworks.

Further, the ESH PDU transmits the "MAC address value" and the "network address value" of the end device.

The intermediate devices 1a, 1b receive the ESH PDU. The intermediate devices 1a, 1b recognize that the end devices 2a–2d are not capable of communicating when the intermediate devices 1a, 1b stop receiving the ESH PDU to be transmitted from the end devices 2a–2d.

Figure 11:
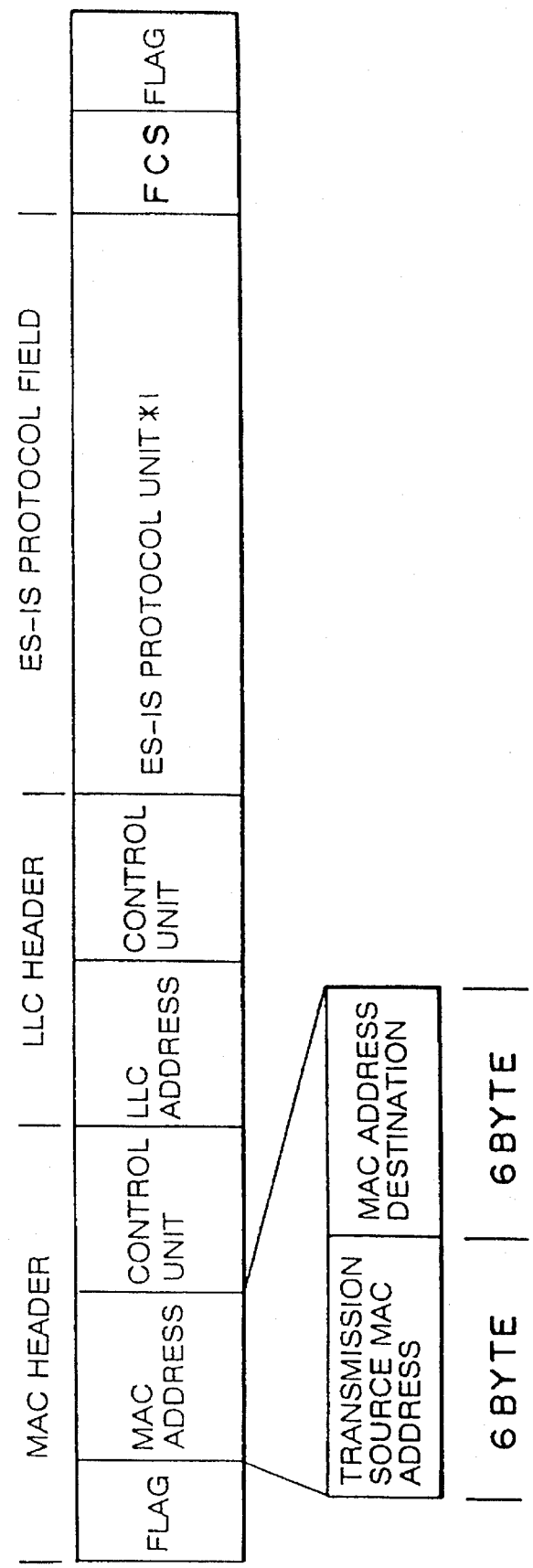
FIG. 11 is a diagram indicating a format of RD PDU when a destination of redirect is the intermediate device.

(c) FIG. 11 is a diagram indicating the format of the RD PDU when the redirect destination is the intermediate device. In the format configuration of the RD PDU, the configuration of the ES-IS protocol field is different from the configuration shown in FIG. 7. Consequently, other configurations are the same as the configurations of the ISH PDU shown in FIG. 7, so the explanation about the same configurations will be omitted.

Figure 12:
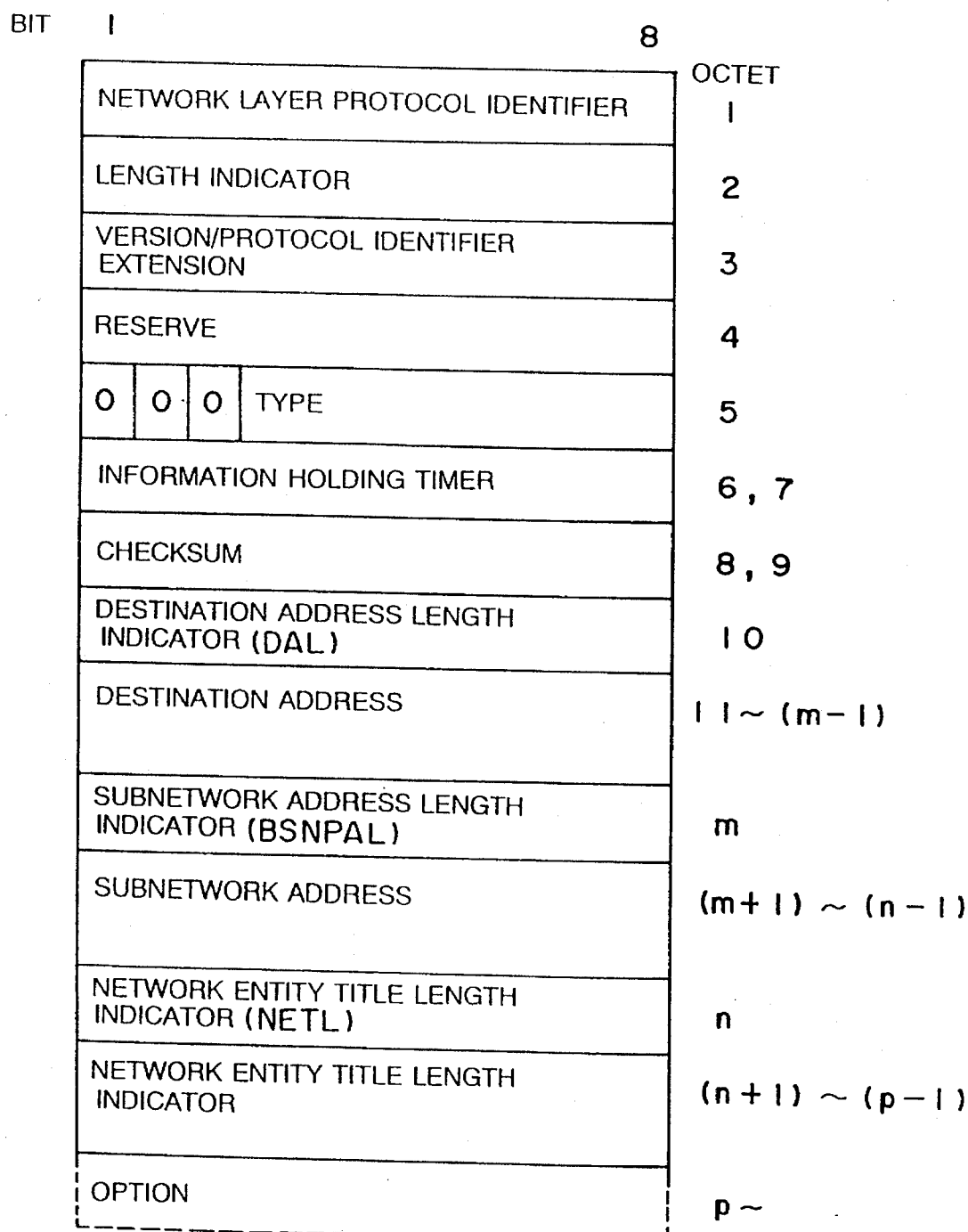
FIG. 12 is a diagram indicating a format of ES-IS protocol field of ESH PDU.

FIG. 12 is a diagram indicating the format configuration of the ES-IS protocol field shown in FIG. 11.

The format comprises a network layer protocol identifier, a length indicator, a version/protocol identifier extension, a reserve and a type.

The format comprises an information holding timer, a checksum, a destination address length indicator, a destination address, and a subnetwork address length indicator.

The format comprises a subnetwork address, a network entity title length indicator, a network entity title length indicator, and an option.

The destination address is the destination network address of the DT NPDU which is the dominant cause for generating the PDU. The subnetwork address is the subnetwork address of the intermediate device which is the redirect destination. The network entity title length indicator indicates the network entity title of the intermediate device which is the redirect destination.

The value of the version/protocol identifier extension is, for instance, x"01". The value of the reserve is, for instance, x"00". The type indicates the RD, and its value is B "00110".

Figure 13:
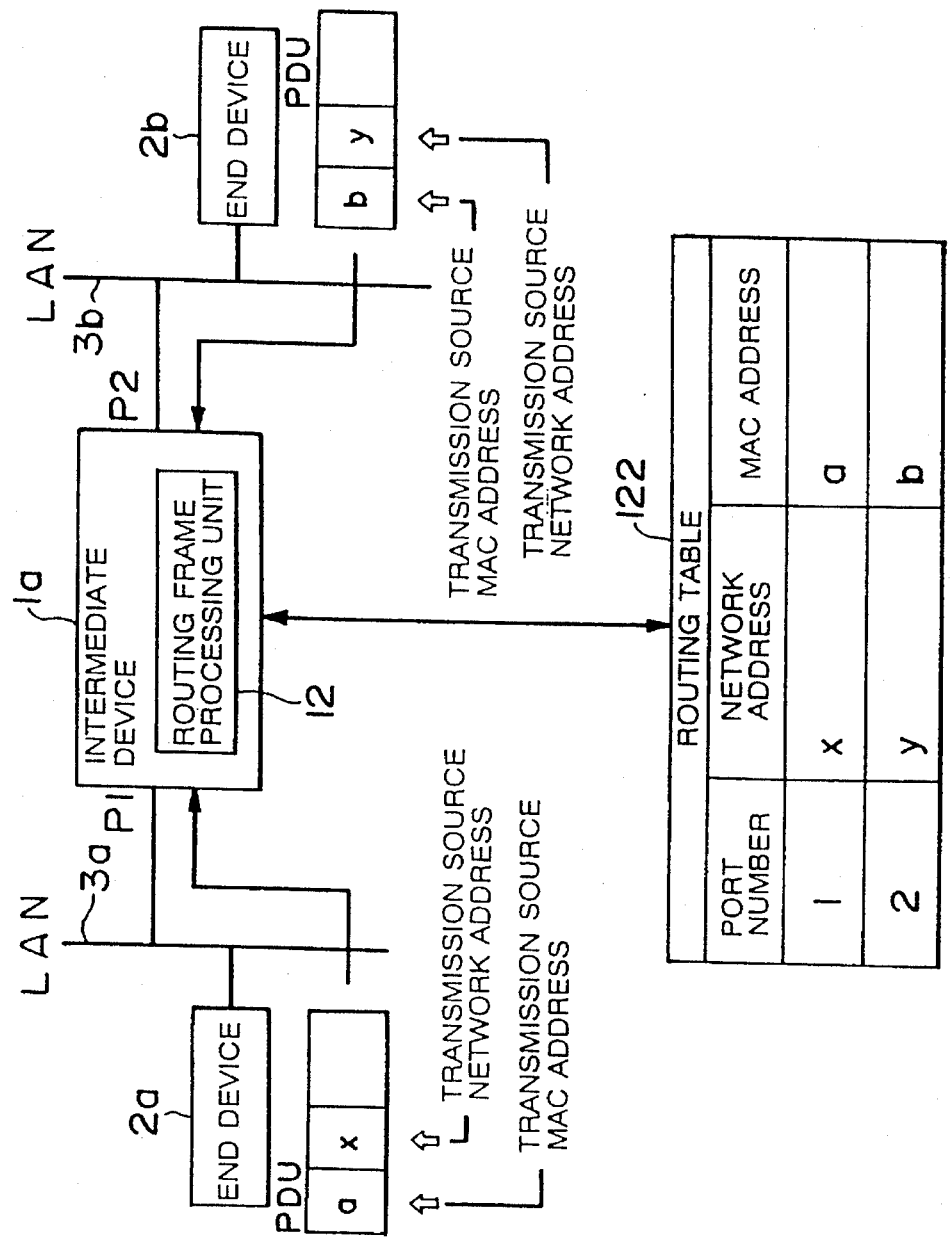
FIG. 13 is a diagram indicating the creation of a routing table.

FIG. 13 is a diagram indicating the creation of the routing table 122. The routing frame processing unit within the intermediate device 1a creates the routing table 122 by recognizing the address of another end device automatically.

In FIG. 13, the LAN 3a is connected to the port P1 of the intermediate device 1a, and the LAN 3b is connected to the port P2.

The end device 2a is connected to the LAN 3a, and the end device 2b is connected to the LAN 3b. The transmission resource MAC address and the network address X are set up on the end device 2a. The MAX address b and the network address y are set up on the end device 2b.

Hereupon, the routing frame processing 12 recognizes the address of the end device 2a by referring to the transmission source MAC address and the transmission source network address set up on the ESH PDU it received, for instance, when the intermediate device 1a receives the ESH PDU from the end device 2a.

The routing frame processing 12 creates the routing table 122 which makes the learned MAC address, the network address and the port number which indicates that the end device having its address is on the port P1 or P2 corresponding one another.

The intermediate device 1a decides the port to which the frame is output by referring to the routing table 122 when the intermediate device 1a receives the DT PDU of a certain destination.

Figure 14:
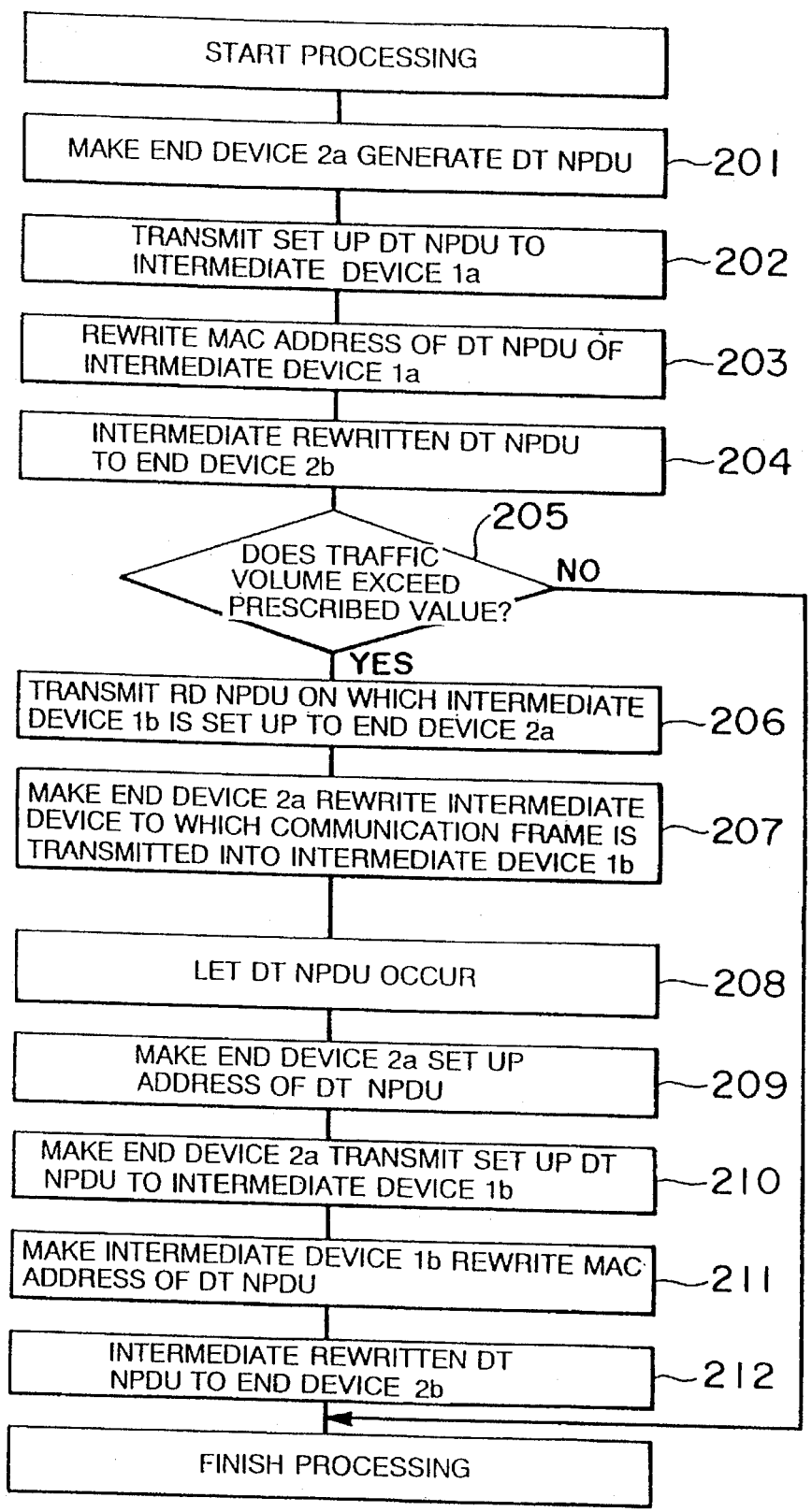
FIG. 14 is the flowchart indicating the method for traffic distribution of the embodiment 2.

FIG. 14 is the flowchart indicating the method for traffic distribution of the embodiment 2. The method for traffic distribution of the embodiment 2 will be explained referring to the drawings.

First of all, the routing frame processing unit 12 within the intermediate devices 1a, 1b transmits the ISH PDU including its MAC address and its network entity title.

The routing frame processing unit 23 within the end devices 2a–2d transmits the ESH PDU including its MAC address and its network address.

Further, intermediate devices 1a, 1b and the end devices 2a–2d receive the ESH PDU or the ISH PDU including the MAC address and the network address or the network entity title.

Then the routing frame processing unit 12 creates the routing table 122 in advance by referring to these addresses. The routing frame processing unit 23 creates the routing table 222 in advance by referring to these addresses.

Then, in the end device 2a, the communication frame processing unit 22 generates the DT NPDU on which the transmission source MAC address and the network address are set up (Step 201).

Figure 15:
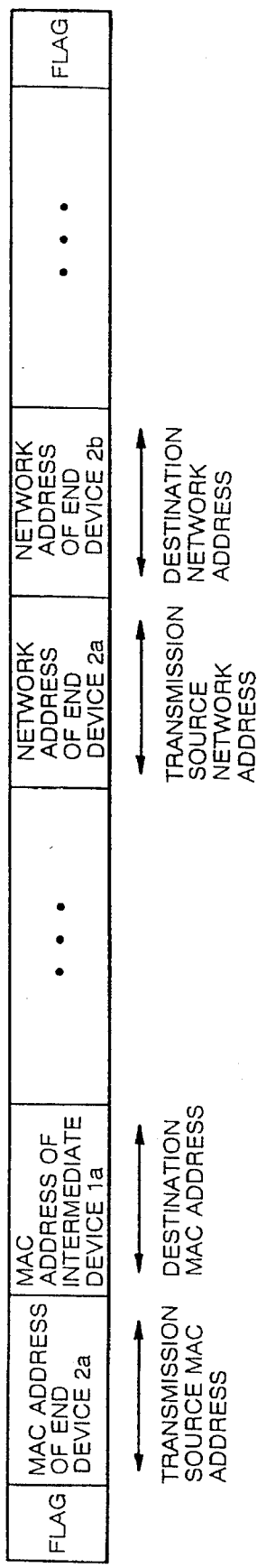
FIG. 15 is a diagram indicating the address setting by the end device.

The communication frame processing generates, for instance, the DT NPDU shown in FIG. 15. The DT NPDU comprises a MAC address of the end device 2a which indicates the transmission source MAC address, a MAC address of the intermediate device 1a which indicates the destination MAC address. The DT NPDU comprises a network address of the end device 2a which indicates the transmission source network address and a network address of the end device 2b which indicates the destination network address.

Further, the frame transmission/receiving unit 24 transmits the generated DT NPDU to the intermediate device 1a (Step 202).

Then the frame receiving unit 11 receives the DT NPDU from the end device 2a in the intermediate device 1a. The frame transmission unit 14 rewrites the transmission source MAC address and the destination address of the DT NPDU (Step 203).

Figure 16:
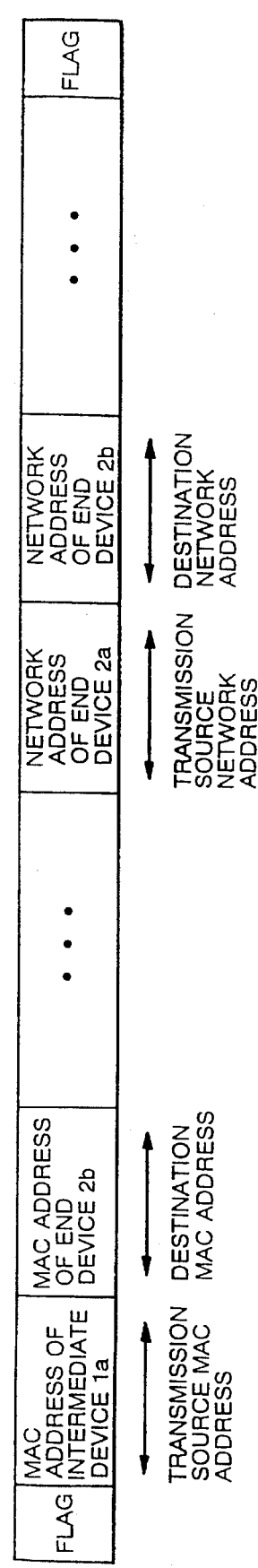
FIG. 16 is a diagram indicating a MAC address rewriting by the intermediate device.

For instance, as shown in FIG. 16, the frame transmission unit 14 as the transmission source MAC address rewrites the MAC address of the end device 2a into the MAC address of the intermediate device 1a. The frame transmission unit 14 as the destination MAC address rewrites the MAC address of the intermediate device 1a into the address of the end device 2a.

The frame transmission unit 14 does not rewrite the transmission source network address and the destination network address. The rewritten DT NPDU is intermediated to the end device 2b (Step 204).

Further, the traffic detection unit 15 within the intermediate device 1a detects the traffic volume from the intermediate device to the LAN 3b. And the traffic detection unit 15 judges whether the traffic volume exceeds the predetermined value (Step 205).

Hereupon, the routing frame processing unit 12 transmits the RD NPDU on which the intermediate device 1b is set up as another intermediate device to the end device 2a, when the traffic volume exceeds the prescribed value (Step 206).

Figure 17:
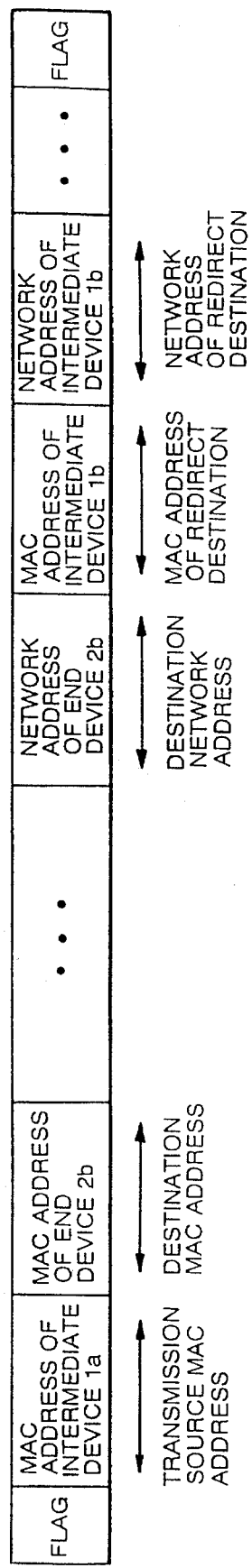
FIG. 17 is a diagram indicating a redirect by the intermediate device.

For instance, the RD NPDU is configured as shown in FIG. 17. The RD NPDU comprises a MAC address of the intermediate device which is the redirect destination and the network entity title of the intermediate device which is the redirect destination, as well as the address of the DT NPDU shown in the FIG. 16.

The MAC address of the intermediate device which is the redirect destination is provided behind the network address of the end device 2b and is the MAC address of the intermediate device 1b.

The network entity title of the intermediate device which is the redirect destination indicates the network entity title of the intermediate device 1b.

Then, the routing frame processing port 23 rewrites the "DT NPDU" within the routing table 222 from the intermediate device 1a to be transmitted to the intermediate device 1b, when the end devices 2a receives the RD NPDU (Step 207).

Figure 18:
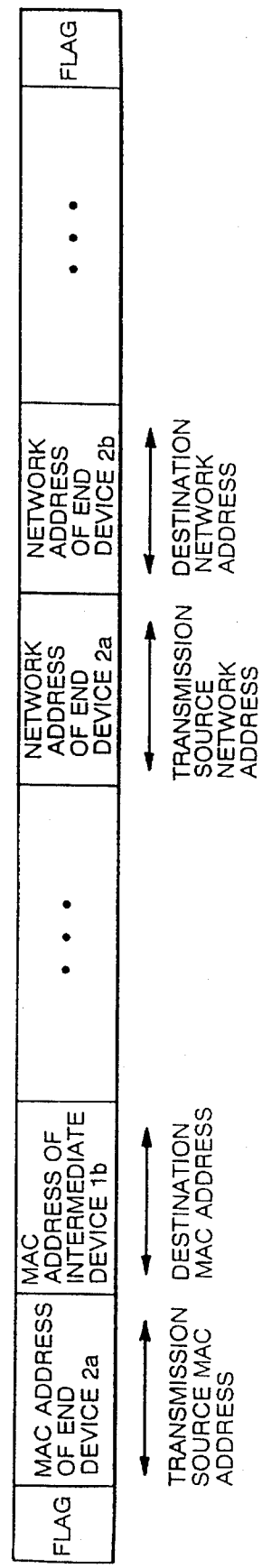
FIG. 18 is a diagram indicating the address setting by the end device after receiving the RD PDU.

Further, the end device 2a sets up the address of the DT NPDU as shown in FIG. 18 in accordance with the routing table 222, when the DT NPDU to be transmitted occurs (Step 209).

Namely, as shown in FIG. 18, the end device 2a as the destination MAC address shown in FIG. 15 rewrites the address of the intermediate device 1a into the address of the intermediate device 1b.

The end device 2a does not rewrite the transmission source network address, the destination network address and the transmission source MAC address. The end device 2a transmits the DT NPDU shown in FIG. 18 to the intermediate device 1b (Step 210).

Finally, the intermediate device 1b receives the DT NPDU from the end device 2a. The intermediate device 1b rewrites the transmission source MAC address and the destination MAC address of the DT NPDU (Step 211).

Figure 19:
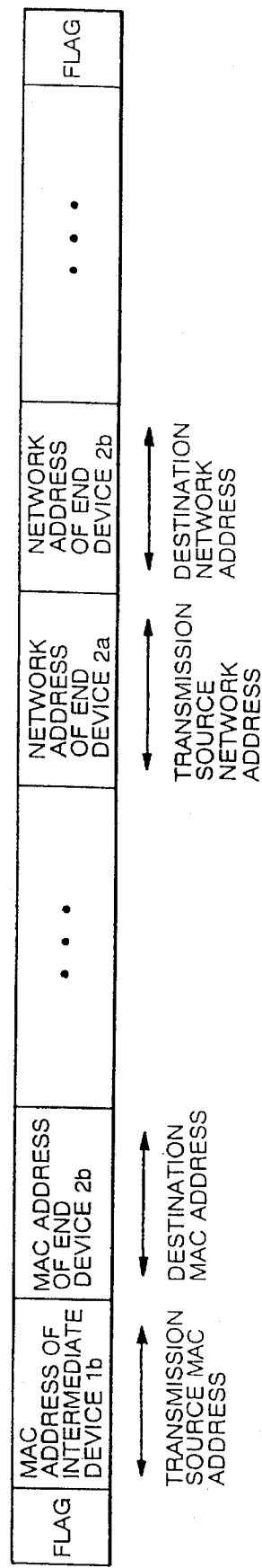
FIG. 19 is a diagram indicating the MAC address rewriting by the intermediate device.

For instance, as shown in FIG. 19, the intermediate device 1b as the transmission source MAC address rewrites the MAC address of the end device 2a into the MAC address of the intermediate device 1b. The intermediate device 1b as the destination MAC address rewrites the MAC address of the intermediate device 1b into the address of the end device 2b.

The intermediate device 1b does not rewrite the transmission source network address and the destination network address. The intermediate device 1b intermediates the rewritten DT NPDU to the end device 2b through the network 3b (Step 212). The processing will be finished by executing the processes described hereinbefore entirely.

As described hereinbefore, the traffic volume passing to the network can be distributed dynamically in the embodiment 2. For this reason, the disconnection of the communication and the decline of the communication speed will be avoided.

Besides, usually only one line is used in the line in which the transmission line is accounted according to time. Another line is also used when the traffic volume is increased. In this case, the accounting is saved.

Further, the usual routing frame processing unit is used in the embodiments. For this reason, it does not take much trouble for the mounting when the usual routing frame processing unit is mounted to the end device. Besides, the configuration of the intermediate device of the embodiment 2 can be realized by adding a comparatively small amount of mounting to the intermediate device mounted with the usual routing frame processing unit.

What is claimed is:

1. A system for traffic distribution comprising:

a plurality of networks;

a plurality of end devices which are connected to each of the networks, and transmit and receive a communication frame and a routing frame; and a plurality of intermediate devices which connect the plurality of networks to one another and receive the communication frame and the routing frame from one of said networks and transmit the communication frame and the routing frame to another network of a destination of said networks; wherein each of the plurality of intermediate devices comprises:

receiving means which receives the communication frame and the routing frame transmitted from an end device of a transmission source;

detection means which detects a traffic volume of the communication frame transmitted to said another network of the destination;

routing frame processing means which creates a frame including a media access control address that indicates an access point at which said intermediate device is connected to said one of said networks, and a network entity title which indicates an address allocated to the intermediate device so as to inform the frame as the routing frame to said end devices connected to each of said networks, and creates a routing frame that indicates an intermediate device other than said intermediate device when the traffic volume exceeds a prescribed value; and transmission means which receives the communication frame directly from said receiving means and transmits the communication frame to an end device of destination and transmits the routing frame that indicates said other intermediate device from said routing frame processing means to said end device of the transmission source.

2. A system for traffic distribution according to claim 1, wherein said routing frame processing means receives from the receiving means the media access control address which indicates the access point at which said end device is connected to said network from each of the end devices of each network and a network address which indicates an address allocated to said end device, and creates a routing table which makes the media access control address and the network address corresponding one another in each end device.

3. A system for traffic distribution according to claim 1, wherein each of said end devices comprises:

communication frame processing means which generates a communication frame to be transmitted and processes a communication frame received thereby;

frame transmission/receiving means which receives the routing frame including the media access control address and the network entity title of each of the intermediate devices, and transmits the communication frame to said intermediate device after receiving the routing frame which indicates the intermediate device other than said intermediate device; and routing frame processing means, coupled to said frame transmission/receiving means, for managing the media access control address and the network entity title of said each intermediate device, received by said frame transmission/receiving means;

wherein said frame transmission/receiving means transmits the frame to said intermediate device indicated by the routing frame after receiving the routing frame.

4. A system for traffic distribution according to claim 3, wherein said routing frame processing means comprises:

a routing table which manages the media access control address and the network address of said end device, and the media access control address and the network entity title of each of said intermediate devices, received by said frame transmission/receiving means; and address rewriting means which rewrites a destination media access address of the frame to be transmitted into the media access control address of said intermediate device indicated by the routing frame.

5. A system for traffic distribution according to claim 1, wherein the routing frame comprises:

a header including the media access control address;

a header including a logical link control address which indicates a logical link procedure among said end devices; and a protocol field.

6. A system for traffic distribution according to claim 1, wherein said routing frame processing means receives the media access control address and the network address from each of said end devices, and creates a routing table which makes the media access control address, the network address and a network port corresponding one another.

7. A system for traffic distribution according to claim 5, wherein the protocol field comprises:

a network protocol layer identifier for identifying that the frame is either the communication frame or the routing frame; and the network entity title.

8. A system for traffic distribution according to claim 1, wherein said routing frame processing means comprises:

an address rewriting means which rewrites the media access control address of the intermediate device connected to said end device of the destination coupled to said another network, within the routing table and the network entity title into the address that indicates the intermediate device other than said intermediate device.

9. A method for traffic distribution which distributes a traffic volume of a plurality of networks by transmitting and receiving a communication frame and a routing frame to and from end devices connected to each of a plurality of networks, by a plurality of intermediate devices which connect the plurality of networks to one another, the method comprising:

a receiving step of receiving a communication frame and a routing frame transmitted from an end device of a transmission source;

a detecting step of detecting a traffic volume of the communication frame transmitted to an end device of a destination;

a routing-frame-processing step of creating a frame including a media access control address that indicates an access point at which an intermediate device is connected to one of said networks, and a network entity title which indicates an address allocated to said intermediate device so as to inform the frame as the routing frame to the end device of the transmission source, and creating a routing frame that indicates an intermediate device other than said intermediate device when the traffic volume exceeds a prescribed value; and a transmitting step of transmitting the communication frame received in said receiving step to the end device of destination, and transmitting the routing frame which indicates the intermediate device other than said intermediate device to the end device of the transmission source.

10. A method for traffic distribution according to claim 9, wherein said routing frame processing step receives the media access control address that indicates the access point at which the end device of the transmission source is connected to the network and the network address which indicates an address allocated to the transmission source, and creates a routing table which makes the media access control address and the network address corresponding one another in each end device of the transmission source.

11. A method for traffic distribution according to claim 9, further comprising:

a communication-frame-processing step of creating a communication frame to be transmitted and processing a communication frame received;

a frame transmission/receiving step of receiving the routing frame including the media access control address and the network entity title of said each intermediate device of said plurality of intermediate devices, and transmitting the communication frame to said intermediate device after receiving the routing frame which indicates the intermediate device other than said intermediate device; and a routing-frame-processing step of managing the media access control address and network entity title of said each intermediate device, received in said frame transmission/receiving step;

wherein said frame transmission/receiving step transmits the frame to said intermediate device indicated by the routing frame after receiving the routing frame.

12. A method for traffic distribution according to claim 11, wherein said routing frame processing step comprises:

a creating step of creating a routing table that manages the media access control address and the network address of the transmission source and the media access control address and network entity title of each said intermediate device received by said frame transmission/receiving step; and an address-rewriting step of rewriting a destination media access address of the frame to be transmitted into the media access control address of said intermediate device indicated by the routing frame.

13. A method for traffic distribution according to claim 9, wherein the routing frame comprises:

a header including the media access control address;

a header including the logical link control address which indicates the logical link procedure between the transmission source and the destination; and a protocol field.

14. A method for traffic distribution according to claim 9, wherein said routing frame processing step creates a routing table that makes the media access control address, the network address and the network port of another end device of transmission source received corresponding one another.

15. A method for traffic distribution according to claim 13, wherein the protocol field comprises:

a network layer protocol identifier for identifying that the frame is either the communication frame or the routing frame; and the network entity title.

16. A method for traffic distribution according to claim 9, wherein said routing frame processing step comprises:

an address rewriting step which rewrites the media access control address and the network entity title of said intermediate device connected to said end device of destination within the routing table into the address which indicates the intermediate device other than said intermediate device.

17. A intermediate device, comprising:

receiving means which receives a communication frame and a routing frame transmitted from an end device of a transmission source through a first network connected to the transmission source;

detection means which detects a traffic volume of the communication frame transmitted to a second network connected to an end device of a destination;

routing frame processing means which creates a frame including a media access control address that indicates an access point at which said intermediate device is connected to the first and second networks, and a network entity title which indicates an address allocated to said intermediate device so as to inform the frame as the routing frame to said end device of each network, and creates a routing frame that indicates an intermediate device other than said intermediate device when the traffic volume exceeds a prescribed value; and transmission means which transmits the communication frame received by said receiving means to said end device of the destination, and transmits the routing frame which indicates the intermediate device other than said intermediate device from said routing frame processing means to said end device of the transmission source.

18. An end device, comprising:

communication frame processing means which generates a communication frame to be transmitted and processes a communication frame received thereby;

frame transmission/receiving means which receives a routing frame including a media access control address that indicates an access point at which each of a plurality of intermediate devices are connected to each of a plurality of networks and a network entity title which indicates an address allocated to each of said intermediate devices, and transmits the communication frame and the routing frame to each of said intermediate devices after receiving the routing frame which indicates another intermediate device; and routing frame processing means which manages the media access control address and the network entity title of said each of said intermediate devices received by said frame transmission/receiving means, said frame transmission/receiving means transmitting the frame to said intermediate device indicated by the routing frame after receiving the routing frame.

* * * * *